Patented May 11, 1948

2,441,470

UNITED STATES PATENT OFFICE 2,441,470

PROCESS FOR INSOLUBILIZING HYDROLYZED POLYVINYL ACETATE

Thomas S. Carswell, Longmeadow, Mass., assignor to Monsanto Chemical Company, St. Louis, Mo., a corporation of Delaware No Drawing. Application January 31, 1944,
Serial No. 520,544

3 Claims. (Cl. 117—138.8)

This invention relates to a method for obtaining insoluble and infusible products from articles made from water-soluble, fusible hydroxylated vinyl resins and to the products made thereby. More specifically, this invention relates to a method for obtaining insoluble and infusible products from articles made from polyvinyl alcohol and to products made thereby.

Articles made from polyvinyl alcohol and other fusible, water-soluble hydroxylated vinyl resins have the disadvantage of relatively poor water resistance and are subject to deformation at elevated temperatures. For such reasons only limited use has been made of fusible, water-soluble hydroxylated vinyl resins in forming useful articles.

One object of this invention is to render insoluble and infusible, articles made from water-soluble, fusible hydroxylated vinyl resins. A particular object of this invention is to render insoluble and infusible, articles made from polyvinyl alcohol.

According to this invention, articles made from water-soluble, hydroxylated fusible vinyl resins, such as sheets, films, foils, fabrics, tubes, rods and the like are treated with unsaturated aldehydes. The aldehydes used, according to this invention, are aliphatic or aryl aliphatic aldehydes which contain an unsaturated carbon to carbon linkage in the aliphatic chain such as, for example, acrolein, crotonaldehyde, tiglic aldehyde, propiolaldehyde, cinnamaldehyde, citral, etc. In general, these aliphatic aldehydes may contain from 3 to 20 carbon atoms. When desired, mixtures of unsaturated aldehydes may be used and under certain circumstances mixtures of saturated and unsaturated aldehydes, provided sufficient of the unsaturated aldehyde reacts to produce the desired infusibility and insolubility. For example, in the case of polyvinyl acetate hydrolysis products at least one unsaturated aldehyde molecule should be reacted for every five vinyl units to produce substantially complete infusibility and insolubility.

According to one embodiment of this invention, formed articles such as sheets, films, foils, fibers and fibrous products such as textile products, tubes, rods and the like made from polyvinyl alcohols by known processes are treated with a liquid medium such as water or an organic solvent containing an unsaturated aldehyde.

Polyvinyl alcohol is a water-soluble, resin-like material which is usually obtained by the hydrolysis of polymerized vinyl esters such as polyvinyl acetate. Polyvinyl alcohol can be made in a number of modifications of different degrees of polymerization, the degree of polymerization depending largely upon the extent to which the vinyl compound from which it is derived has been polymerized. All of these modifications of polyvinyl alcohol are, to some extent, soluble in water. The more highly polymerized forms are less soluble and produce solutions of higher viscosities for equivalent concentrations than the lower polymers.

The so-called partial derivatives of polyvinyl alcohol comprise polyvinyl alcohol in which some, e. g., 3–5% or more of the hydroxyl groups in the molecule are replaced by other radicals such as ester radicals or acetal radicals. Such partial derivatives may be produced by the incomplete saponification of polyvinyl esters or by the incomplete reaction of polyvinyl alcohol with aldehydes, organic acids, or other compounds which react with hydroxyl groups. As would be expected, the properties of the partial derivatives of polyvinyl alcohol vary in accordance with the proportion of hydroxyl radicals that have been substituted by other groups. When the hydroxyl radicals sufficiently predominate, the partial derivatives show essentially the properties of polyvinyl alcohol and, like polyvinyl alcohol itself, are soluble in water as distinguished from the esters, acetals, etc., which are soluble only in organic solvents.

The term "polyvinyl alcohol" is used herein to designate the complete or substantially complete hydrolysis product of polyvinyl esters, which may contain at the most 3–5% of ester, acetal or other radicals. Such partial derivatives thereof as contain a sufficient number of unsubstituted hydroxyl groups as to render the compound soluble in water and contain more than about 3–5% of ester, acetal or other groups, may also be employed. Polyvinyl alcohol and its water-soluble partial derivatives are designated generically as water-soluble hydroxylated vinyl resins derived from polyvinyl esters.

Other water-soluble, hydroxylated vinyl resins may be employed, for example, those obtained by polymerizing vinyl compounds containing free hydroxyl radicals such as vinyl esters of hydroxy acids, for example, vinyl glycollate or vinyl lactate, or by hydrolyzing groups other than acyl groups from polyvinyl compounds, as for example, chlorine or other halogen atoms. As examples of other hydroxylated vinyl resins which may be employed are polymerized hydroxylated vinyl ethers, such as polymerized ethylene glycol monovinyl ether, polymerized diethylene glycol mono-vinyl ether, and the like.

The water-soluble resins contemplated by this invention are water-soluble by virtue of the hydroxyl groups they contain although they may contain other hydrophilic groups.

Exemplifications of the process of this invention follow. Where parts are mentioned, they are parts by weight.

Example I

A cast film of polyvinyl alcohol, 0.005 inch thick, is passed into a bath of the following composition maintained at room temperature:

| | Parts |
|---|---|
| Crotonaldehyde | 10 |
| Ethanol | 80 |
| Water | 9 |
| Sulfuric acid | 1 |

The film is allowed to remain in the bath for about 30 minutes, then removed from the bath and thoroughly washed, first with dilute aqueous ethanol and then with water, and finally dried. The resultant film is infusible and insoluble in water and common organic solvents such as ethanol, ethyl lactate, toluene and the like.

Example II

A tube one-half inch in diameter and having a 0.010 inch wall thickness, made from water-soluble, fusible, polyvinyl acetate hydrolyzed to the extent of 75%, is extruded into a bath of the following composition:

| | Parts |
|---|---|
| Acrolein | 10 |
| Ethanol | 80 |
| Water | 9 |
| Sulfuric acid | 1 |

The bath is maintained at a temperature of 50° C. and the tube is allowed to remain in the bath for 15 minutes. The treated tube is then led through a washing tank containing an aqueous solution of ethanol, a second washing tank containing water, a drier and finally wound on a reel. The product is insoluble in water and common organic solvents and is infusible.

The composition of the bath, the length of treatment, the catalyst and the temperature of the bath may be varied according to the nature of the vinyl resin, the aldehyde and the degree of insolubility and infusibility desired in the finished product. In general, an excess of the unsaturated aldehyde is employed and the degree of reaction is governed by the duration of immersion in the aldehyde. When continuous processes are used it may be necessary to restore the bath continuously or from time to time to its original strength by adding the components in the proportions in which they are used up.

In a preferred embodiment of this invention the aldehyde employed contains from 3 to 10 carbon atoms. In a particularly preferred embodiment when aliphatic aldehydes are used, the aldehyde employed contains from 3 to 5 carbon atoms. When aryl substituted aliphatic aldehydes are used, it is preferred that the aryl group be a phenyl group.

The rate of the reactions may be increased by raising the temperature of the treating bath, using pressure when needed to prevent loss of ingredients from the bath by boiling. Within limits, the rate of reaction may be increased by increasing the concentration of aldehyde and/or of the catalyst.

By proper control of the reaction conditions disclosed above, products may be obtained which are insoluble and infusible only on the surface or the penetration of the unsaturated aldehyde may be allowed to proceed partially or entirely through the article being treated. The particular advantage of this process is that articles of substantial thickness, for example, 0.005 inch or more, may be rendered insoluble and infusible on the surface without the necessity of rendering the entire object insoluble and infusible, but where it is necessary for the entire articles to be made insoluble and infusible, it is possible to attain that object by treating the article for longer times and/or higher temperatures.

Articles made according to this invention are valuable for uses requiring resistance to water and organic solvents and to plastic deformation, for example, for packaging purposes, lampshades, textile products such as filter cloth material, bristles, tubes for carrying water and organic liquids such as solvents, oils, gasoline and the like. Articles made according to the process of this invention may be used at relatively high temperatures such as prevail in deserts or tropical climates due to the infusible nature of the product.

According to one embodiment of this invention, articles of hydroxylated polyvinyl compounds such as sheets, and rods or other configurations which lend themselves to continuous formation are continuously formed and continuously insolubilized by treatment with unsaturated aldehydes. Thus, sheets of polyvinyl alcohol may be continuously formed by extrusion through an orifice or by casting a film on a revolving wheel from an aqueous solution and after partial drying, continuously removing the film from the wheel. Such sheets which may, for example, be 0.003–0.005 inch in thickness may then be continuously passed through a suspension or solution of an unsaturated aldehyde such as the solution set forth in Example I. The duration of the immersion in the solution is so correlated with the temperature of the solution as to cause the desired amount of reaction to take place. For example, immersion of a 0.003 inch sheet of polyvinyl alcohol in the solution of Example I for 30 minutes at room temperature produces insolubilization throughout the sheet. Thereafter, the reacted sheet may be continuously passed through washing solutions such as those used in Example I, continuously passed through a drier and finally continuously reeled up into a roll for future disposition.

According to another embodiment of this invention, the unsaturated aldehyde may be incorporated with the hydroxylated vinyl compound prior to formation of the hydroxylated vinyl compound into the desired article and thereafter the unsaturated aldehyde reacted by raising the temperature of the article and/or by treatment with a catalyst. For example, 100 parts of crotonaldehyde may be incorporated with 100 parts of polyvinyl alcohol and the resulting composition extruded in the form of sheets, 0.003–0.005 inch in thickness and the resulting sheet subjected to the action of a solution containing 80 parts of ethanol, 9 parts of water and 1 part of sulfuric acid, at room temperature for about 30 minutes. The resulting sheet is infusible and insoluble in water and common organic solvents.

According to another embodiment of this invention, the hydroxylated vinyl resin and catalyst may be mixed and after formation into the desired configuration, treated with the unsaturated aldehyde according to any of the methods set forth hereinbefore.

What is claimed is:

1. A process for preparing an infusible article which is insoluble in both water and organic solvents which comprises immersing a water-soluble hydrolyzed polyvinyl acetate article in a bath comprising an excess of an unsaturated aldehyde of the class consisting of aliphatic and aryl substituted aliphatic aldehydes which contain an unsaturated carbon to carbon linkage in the aliphatic portion of the molecule, sulfuric acid catalyst, ethanol and water, until the article is rendered infusible and insoluble in water and organic solvents, and at least one unsaturated aldehyde molecule is reacted for every five vinyl units in the hydrolyzed polyvinyl acetate, ethanol and water being present in the weight ratio 80:9.

2. A process as defined in claim 1 in which the unsaturated aldehyde is crotonaldehyde.

3. A process as defined in claim 1 in which the unsaturated aldehyde is acrolein.

THOMAS S. CARSWELL.

REFERENCES CITED

The following references are of record in the file of this patent:

UNITED STATES PATENTS

| Number | Name | Date |
| --- | --- | --- |
| 2,044,730 | Kuehn | June 16, 1936 |
| 2,083,628 | Zelger | June 15, 1937 |
| 2,249,514 | Berg | July 15, 1941 |
| 2,332,896 | D'Alelio | Oct. 26, 1943 |
| 2,370,126 | Dahle | Feb. 27, 1945 |